(12) United States Patent
Ishikawa (10) Patent No.: US 9,799,889 B2
(45) Date of Patent: Oct. 24, 2017

(54) METHOD OF PRODUCING CORE-SHELL CATALYST

(71) Applicant: TOYOTA JIDOSHA KABUSHIKI KAISHA, Toyota-shi, Aichi-ken (JP)

(72) Inventor: Shotaro Ishikawa, Yokohama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/170,075

(22) Filed: Jun. 1, 2016

(65) Prior Publication Data

US 2016/0359171 A1    Dec. 8, 2016

(30) Foreign Application Priority Data

Jun. 2, 2015  (JP) .................................. 2015-112125

(51) Int. Cl.
| | |
|---|---|
| *B01J 23/00* | (2006.01) |
| *H01M 4/86* | (2006.01) |
| *C23C 18/54* | (2006.01) |
| *H01M 4/92* | (2006.01) |

(52) U.S. Cl.
CPC ........... *H01M 4/8657* (2013.01); *C23C 18/54* (2013.01); *H01M 4/926* (2013.01)

(58) Field of Classification Search
CPC ...... H01M 4/8657; H01M 4/926; C23C 18/54
USPC ....................................................... 502/325
See application file for complete search history.

(56) References Cited

U.S. PATENT DOCUMENTS

| | | | |
|---|---|---|---|
| 2006/0135359 A1* | 6/2006 | Adzic ................. | H01M 4/8657 502/326 |
| 2015/0093682 A1 | 4/2015 | Kimura et al. | |

FOREIGN PATENT DOCUMENTS

| | | |
|---|---|---|
| JP | 2013-239331 A | 11/2013 |
| JP | 2014-108380 A | 6/2014 |
| JP | 2016-032790 A | 3/2016 |
| JP | 2016-137425 A | 8/2016 |

OTHER PUBLICATIONS

Machine Translation of JP2014108380, Jun. 12, 2014.*

* cited by examiner

*Primary Examiner* — Haytham Soliman
(74) *Attorney, Agent, or Firm* — Andrews Kurth Kenyon LLP (57) ABSTRACT

A copper-coated palladium-containing particle dispersion in which copper-coated palladium-containing particles, which are obtained by coating surfaces of palladium-containing particles with copper, are dispersed is prepared, a platinum ion-containing solution is prepared, and a shell is formed by mixing the copper-coated palladium-containing particle dispersion and the platinum ion-containing solution with each other in a microreactor to displace copper of the copper-coated palladium-containing particle surfaces with platinum. The microreactor includes at least a first supply flow path, a second supply flow path, a joint portion in which the first supply flow path and the second supply flow path are joined to each other, and a discharge flow path. An orifice portion is provided midway in the discharge flow path. A pressure applied to the orifice portion in the displacement step is 2 MPa or higher.

3 Claims, 3 Drawing Sheets

METHOD OF PRODUCING CORE-SHELL CATALYST

INCORPORATION BY REFERENCE

The disclosure of Japanese Patent Application No. 2015-112125 filed on Jun. 2, 2015 including the specification, drawings and abstract is incorporated herein by reference in its entirety.

BACKGROUND OF THE INVENTION

1. Field of the Invention

The present invention relates to a method of producing a core-shell catalyst.

2. Description of Related Art

As an electrode catalyst, in particular, as an electrode catalyst for a fuel cell, a core-shell catalyst for reducing the amount of noble metal used such as platinum is known. For example, Japanese Patent Application Publication No. 2013-239331 (JP 2013-239331 A) describes a method of producing a core-shell catalyst through displacement plating to which copper underpotential deposition (Cu-UPD) is applied.

In the related art, a displacement reaction between copper and platinum on palladium-containing particle surfaces after the Cu-UPD treatment is performed using a method (hereinafter, also referred to as "dripping method") of dripping a platinum ion-containing solution onto a copper-coated palladium-containing particle dispersion in which copper-coated palladium-containing particles accommodated in a reaction container are dispersed. The displacement reaction between copper and platinum using the dripping method is likely to occur in a state where the platinum ion-containing solution dripped onto the dispersion, in which the copper-coated palladium-containing particles are uniformly dispersed, is concentrated in the vicinity of the dripping position. As a result, a shell containing platinum is formed to be concentrated on palladium-containing particle surfaces. Therefore, in order to uniformly form a shell containing platinum on the palladium-containing particle surfaces and to improve catalytic activity of platinum per unit mass (hereinafter, also referred to as "platinum mass activity") in the core-shell catalyst, it is necessary to slowly drip the platinum ion-containing solution while stirring the copper-coated palladium-containing particle dispersion. With the dripping method, the dripped platinum ion-containing solution cannot be made uniform in the reaction container instantly, and the platinum ion-containing solution and the copper-coated palladium-containing particles arbitrarily react with each other in a state where the concentration is not uniform. Therefore, some palladium-containing particles may be excessively or insufficiently coated with the shell, the coating state varies depending on the particles, and there is a problem in that the platinum mass activity of the core-shell catalyst is insufficient. Further, in the dripping method, in order to sufficiently advance the displacement reaction between copper and platinum on the copper-coated palladium-containing particle surfaces, it is necessary to stir the reaction solution for a long period of time after the dripping of the platinum ion-containing solution. In particular, there is a problem in that the operating cost increases during large-scale synthesis.

SUMMARY OF THE INVENTION

The present inventors conceived a method of producing a core-shell catalyst using a microreactor. By using the microreactor, the contact speed or contact frequency of the copper-coated palladium-containing particles and the platinum ion-containing solution can be accurately controlled, and the concentration gradient in a reaction field can be suppressed. Accordingly, a variation in the coating state of the shell containing platinum between the respective palladium-containing particles can be reduced, and the shell containing platinum can be uniformly formed on the palladium-containing particle surfaces. Therefore, a core-shell catalyst having high platinum mass activity can be produced. Further, by using the microreactor, the displacement reaction between copper and platinum on the copper-coated palladium-containing particle surfaces can be performed within a short period of time (that is, the time required to discharge a mixed solution to the outside of the microreactor, the mixed solution being obtained by mixing the copper-coated palladium-containing particle dispersion and the platinum ion-containing solution with each other in the microreactor).

However, when a reaction inhibitor such as citric acid is used in the displacement step using the microreactor in order to improve the platinum mass activity in the core-shell catalyst, there is a problem in that a long period of time is required, for example, to clean the obtained core-shell catalyst after the displacement process. The invention provides a method of producing a core-shell catalyst having high platinum mass activity without using a reaction inhibitor during a displacement reaction.

According to an embodiment of the invention, a method of producing a core-shell catalyst is provided. The core-shell catalyst includes a core containing palladium, and a shell containing platinum with which the core is coated. The method includes: a step of preparing a copper-coated palladium-containing particle dispersion in which copper-coated palladium-containing particles, which are obtained by coating surfaces of palladium-containing particles with copper, are dispersed; a step of preparing a platinum ion-containing solution; and a displacement step of forming the shell by mixing the copper-coated palladium-containing particle dispersion and the platinum ion-containing solution with each other in a microreactor to displace copper of the copper-coated palladium-containing particle surfaces with platinum. The microreactor includes a first supply flow path, a second supply flow path, a joint portion in which the first supply flow path and the second supply flow path are joined to each other, and a discharge flow path. An orifice portion is provided midway in the discharge flow path. A pressure applied to the orifice portion in the displacement step is 2 MPa or higher.

The orifice portion may be a cross nozzle. In the method of producing a core-shell catalyst according to the invention, the palladium-containing particles may be supported on a support.

According to the invention, a core-shell catalyst having high platinum mass activity can be produced without using a reaction inhibitor during a displacement reaction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

According to an embodiment of the invention, a method of producing a core-shell catalyst is provided. The core-shell catalyst includes a core containing palladium, and a shell containing platinum with which the core is coated. The method includes: a step of preparing a copper-coated palladium-containing particle dispersion in which copper-coated palladium-containing particles, which are obtained by coating surfaces of palladium-containing particles with copper, are dispersed; a step of preparing a platinum ion-containing solution; and a displacement step of forming the shell by mixing the copper-coated palladium-containing particle dispersion and the platinum ion-containing solution with each other in a microreactor to displace copper of the copper-coated palladium-containing particles surface with platinum. The microreactor includes at least a first supply flow path, a second supply flow path, a joint portion in which the first supply flow path and the second supply flow path are joined to each other, and a discharge flow path. An orifice portion is provided midway in the discharge flow path. A pressure applied to the orifice portion in the displacement step is 2 MPa or higher.

The present inventors found that, by providing the orifice portion midway in the discharge flow path of the microreactor in the steps of producing a core-shell catalyst and by controlling a pressure applied to the orifice portion to be 2 MPa or higher in the displacement step, a core-shell catalyst having high platinum mass activity can be produced without using a reaction inhibitor such as citric acid during a displacement reaction. The reason for this is presumed to be as follows. By providing the orifice portion, a fluid mixture is pressurized again in the process of passing through the orifice portion, which accelerates a flow type reaction. As a result, a dense shell can be formed on palladium-containing particle surfaces, and the platinum mass activity of the core-shell catalyst can be improved. Moreover, according to the invention, a reaction inhibitor is not used. Therefore, a cleaning step after the production of the core-shell catalyst can be simplified, and the productivity of the core-shell catalyst can be improved.

In the invention, the state where the core is coated with the shell refers to not only a state where the entire surface of the core is coated with the shell but also a state where a portion of the surface of the core is coated with the shell and the other portion of the surface of the core is exposed. Further, the shell may be a monoatomic layer or a polyatomic layer in which two or more atoms are laminated. From the viewpoint of improving the platinum mass activity, it is preferable that the shell is a monoatomic layer.

Figure 1:
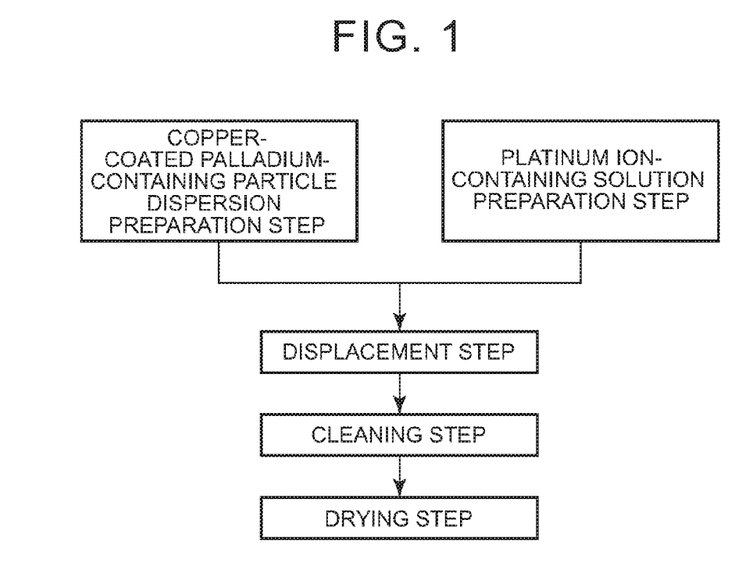
FIG. 1 is a flowchart showing an example of a method of producing a core-shell catalyst according to the invention.

Hereinafter, the method of producing a core-shell catalyst according to the embodiment of the invention will be described in detail. FIG. 1 is a flowchart showing an example of the method of producing a core-shell catalyst according to the invention. The method of producing a core-shell catalyst according to the invention includes (1) a copper-coated palladium-containing particle dispersion preparation step, (2) a platinum ion-containing solution preparation step, and (3) a displacement step and, after the displacement step, optionally further includes (4) a cleaning step and (5) a drying step. Among the steps (1) and (2), any step may be performed first, or the steps (1) and (2) may be simultaneously performed. Hereinafter, each step will be sequentially described.

(1) Copper-Coated Palladium-Containing Particle Dispersion Preparation Step

As the palladium-containing particles which function as a core of the core-shell catalyst, at least one kind of particles selected from palladium particles and palladium alloy particles can be used. Examples of the palladium alloy include an alloy of palladium and a metal material selected from the group consisting of iridium, ruthenium, rhodium, iron, cobalt, nickel, copper, silver, and gold. The metal material other than palladium constituting the palladium alloy may be one kind or two or more kinds. It is preferable that the palladium content in the palladium alloy is 80 mass % or higher when the total mass of the alloy is expressed by 100 mass %. By controlling the palladium content to be 80 mass % or higher, a uniform platinum-containing shell can be formed.

The average particle size of the palladium-containing particles is not particularly limited and is preferably 10 nm or less. In a case where the average particle size of the palladium-containing particles exceeds 10 nm, the surface area of platinum per unit mass is reduced, and a large amount of platinum is necessary to obtain a desired activity, which increases the cost. When the average particle size of the palladium-containing particles is excessively small, palladium is likely to be melted, and the durability of the catalyst is reduced. Therefore, the average particle size of the palladium-containing particles is preferably 3 nm or more. A method of calculating the average particle size of particles, which is used in the invention, is as follows. That is, a TEM image is obtained at 1,000,000 times using a transmission electron microscope (TEM), and the diameter of a true circle (equivalent circle diameter) having the same area as the projected area of a particle on a plane is considered as the particle size of the particle. This particle size measurement using the image observation is performed on the same kind of 500 particles, and the average of the particle sizes of the particles is set as the average particle size. Insufficient particles observed at end portions of the image are excluded from the analysis.

It is preferable that the palladium-containing particles are supported on a support. The support is not particularly limited. However, when the core-shell catalyst according to the invention is used in an electrode catalyst layer of a fuel cell, a conductive support is preferably used from the viewpoint of securing the conductivity in the electrode catalyst layer Specific examples of a material, which can be used as the support for supporting the palladium-containing particles, include: a conductive carbon material such as carbon particles, or a carbon fiber, for example, KETJEN BLACK (trade name; manufactured by Ketjen Black International Co.), VULCAN (trade name; manufactured by Cabot Corporation), NORIT (trade name; manufactured by Norit Nederland BV), BLACK PEARL (trade name; manufactured by Cabot Corporation), or ACETYLENE BLACK (manufactured by Chevron Corporation); a metal material such as metal particles or metal fibers; and a non-conductive material such as an organic pigment, for example, PERYLENE.

The average particle size of the support is not particularly limited but is preferably 0.01 µm to several tens of micrometers and is more preferably 0.01 µm to 1 µm. When the average particle size of the support is less than the above-described range, the support may be corroded, and the palladium-containing particles supported on the support may be peeled off over time. In a case where the average particle size of the support exceeds the above-described range, the specific surface area is reduced, and the dispersibility of the palladium-containing particles may deteriorate.

The specific surface area of the support is not particularly limited but is preferably 50 $m^2/g$ to 2000 $m^2/g$ and more preferably 100 $m^2/g$ to 1600 $m^2/g$. When the specific surface area of the support is less than the above-described range, the dispersibility of the palladium-containing particles on the support deteriorates, and sufficient battery performance may not be exhibited. In a case where the specific surface area of the support exceeds the above-described range, an effective utilization ratio of the palladium-containing particles is reduced, and sufficient battery performance may not be exhibited.

A palladium-containing particle support ratio of the support [{(Mass of Palladium-Containing Particles)/(Mass of Palladium-Containing Particles+Mass of Support)}×100%] is not particularly limited and, in general, is preferably in a range of 20% to 60%. When the support amount of the palladium-containing particles is excessively small, a catalyst function may not be sufficiently exhibited. On the other hand, when the support amount of the palladium-containing particles is excessively large, no particular problem may occur from the viewpoint of the catalyst function; however, even when an excess amount of the palladium-containing particles are supported on the support, it is difficult to obtain an effect corresponding to an increase in production costs. As a method of supporting the palladium-containing particles on the support, a method which is used in the related art can be adopted. Examples of the supporting method include a method including: mixing the palladium-containing particles with the support dispersion in which the support is dispersed; filtering, cleaning, and redispersing the obtained mixture in ethanol or the like; and drying the obtained dispersion using a vacuum pump or the like. Optionally, a heat treatment may be performed. In a case where the palladium alloy particles are used, the synthesis of the alloy and the supporting of the palladium alloy particles on the support may be simultaneously performed.

As a method of coating surfaces of the palladium-containing particles with copper, a method which is used in the related art can be adopted. For example, a Cu-UPD method is preferably used. In the Cu-UPD method, specifically, a higher potential than a redox potential of copper is applied to the palladium-containing particles in a copper ion-containing electrolytic solution. The copper ion-containing electrolytic solution is not particularly limited as long as it is an electrolytic solution in which copper can be deposited on the surfaces of the palladium-containing particles through Cu-UPD. In the copper ion-containing electrolytic solution, typically, a predetermined amount of a copper salt is dissolved in a solvent. However, the copper ion-containing electrolytic solution is not particularly limited to this configuration as long as it is an electrolytic solution in which some or all of the copper ions are present in a dissociated state in the solution. Examples of the solvent used in the copper ion-containing electrolytic solution include water and an organic solvent. From the viewpoint of not interrupting the deposition of copper on the surfaces of the palladium-containing particle, water is preferable. Specific examples of the copper salt used in the copper ion-containing electrolytic solution include copper sulfate, copper nitrate, copper chloride, copper chlorite, copper perchlorate, and copper oxalate. The copper ion concentration in the electrolytic solution is not particularly limited but is preferably 10 mmol/L to 1000 mmol/L. In addition to the solvent and the copper salt, the copper ion-containing electrolytic solution may contain, for example, an acid. Specific examples of the acid which can be added to the copper ion-containing electrolytic solution include sulfuric acid, nitric acid, hydrochloric acid, chlorous acid, perchloric acid, and oxalic acid. Counter anions in the copper ion-containing electrolytic solution may be the same as or different from counter anions in the acid. It is preferable that inert gas is bubbled into the electrolytic solution in advance. The reason for this is that the oxidation of the palladium-containing particles can be suppressed, and the uniform coating of the platinum-containing shell can be performed. As the inert gas, for example, nitrogen gas or argon gas can be used.

The palladium-containing particles may be dipped or dispersed in the electrolytic solution by being added in the powder state to the electrolytic solution, or may be dipped or dispersed in the electrolytic solution by being dispersed in a solvent to prepare a palladium-containing particle dispersion in advance and adding the palladium-containing particle dispersion to the electrolytic solution. As the solvent used in the palladium-containing particle dispersion, the same solvent as that used in the above-described copper ion-containing electrolytic solution can be used. The palladium-containing particle dispersion may contain the above-described acid which can be added to the above-described copper ion-containing electrolytic solution. The palladium-containing particles may be immobilized on a conductive substrate or a working electrode, and the surface of the conductive substrate or the working electrode where the palladium-containing particles are immobilized may be dipped in the electrolytic solution. Examples of a method of immobilizing the palladium-containing particles include a method including: preparing a palladium-containing particle paste using an electrolyte resin (for example, NAFION (registered trade name)) and a solvent such as water or alcohol; and applying the palladium-containing particle paste to a surface of a conductive substrate or a working electrode.

A method of applying a potential to the palladium-containing particles is not particularly limited, and examples thereof include a method including: dipping a working electrode, a counter electrode, and a reference electrode in the copper ion-containing electrolytic solution; and applying a potential to the working electrode. As the working electrode, a material capable of securing conductivity can be used, and examples thereof include: a metal material such as titanium, a platinum mesh, a platinum plate, or a gold plate; and a conductive carbon material such as glassy carbon or carbon. A reaction container formed of the above-described conductive material may also function as the working electrode. In a case where a reaction container formed of a metal material is used as the working electrode, it is preferable that an inner wall of the reaction container is coated with $RuO_2$ from the viewpoint of suppressing corrosion. A reaction container formed of a carbon material can be used as a working electrode without coating. As the counter electrode, for example, a platinum mesh coated with platinum black, or a conductive carbon fiber can be used. As the reference electrode, for example, a reversible hydrogen electrode (RHE), a silver-silver chloride electrode, or a silver-silver chloride-potassium chloride electrode can be used. As a potential control device, for example, a potentiostat or a potentiogalvanostat can be used. The applied potential is not particularly limited as long as it is a potential at which copper can be deposited on the surfaces of the palladium-containing particles, that is, a higher potential than a redox potential of copper. For example, the applied potential is preferably in a range of 0.35 V to 0.7 V (vs. RHE) and more preferably 0.37 V (vs. RHE). The time during which the potential is applied is not particularly limited but is preferably 60 minutes or longer. It is more preferable that the potential is applied until the reaction current is normal and approaches zero.

From the viewpoints of preventing the oxidation of the surfaces of the palladium-containing particles and the oxidation of copper, it is preferable that the Cu-UPD treatment is performed in an inert gas atmosphere such as a nitrogen atmosphere. In the Cu-UPD treatment, it is preferable that the copper ion-containing electrolytic solution is optionally appropriately stirred. For example, in a case where the palladium-containing particles are dipped and dispersed in an electrolytic solution of a reaction container which also functions as a working electrode, the respective palladium-containing particles can be brought into contact with the surface of the reaction container, which is the working electrode, by stirring the electrolytic solution, and the potential can be uniformly applied to the respective palladium-containing particles. In this case, the stirring may be performed continuously or intermittently during the Cu-UPD treatment.

It is preferable that the palladium-containing particles undergoes an oxide removal treatment before the Cu-UPD treatment. Through the oxide removal treatment, a palladium oxide, which is an impurity, can be removed from the surfaces of the palladium-containing particles, and the palladium-containing particles can be uniformly coated with the platinum-containing shell. The oxide removal treatment can be performed, for example, by applying a predetermined potential to the palladium-containing particles in the electrolytic solution containing the palladium-containing particles. As a method of applying the potential to the palladium-containing particles, the same method as that performed in the Cu-UPD treatment can be performed. As the potential control device, the same device used in the Cu-UPD treatment can be used. The electrolytic solution which can be used in the oxide removal treatment is not particularly limited as long as it is a solution in which a palladium oxide can be deposited by scanning an appropriate potential in the electrolytic solution. Specific examples of the electrolytic solution include an acid solution. As the acid which can be used in the oxide removal treatment, the same acid as that which can be used in the copper ion-containing electrolytic solution can be used. In a case where the oxide removal treatment and the Cu-UPD treatment are performed in the same reaction container, the electrolytic solution used in the oxide removal treatment may be added to the copper ion-containing electrolytic solution. For example, in a case where sulfuric acid is used as the electrolytic solution of the oxide removal treatment, sulfuric acid after use may be added to the copper sulfate aqueous solution to perform the Cu-UPD treatment. Counter anion in the electrolytic solution used in the oxide removal treatment may be the same as or different from counter anions in the copper ion-containing electrolytic solution used in the Cu-UPD treatment. It is preferable that nitrogen is bubbled into the electrolytic solution because oxygen can be removed as much as possible and the oxide removal treatment can be rapidly advanced. From the viewpoint of rapidly advancing the oxide removal treatment, it is preferable that the potential is made to reciprocate in a given potential range plural times. A potential application signal pattern is not particularly limited and is, for example, a rectangular wave, a triangular wave, or a trapezoidal wave. The potential range is not particularly limited but is preferably 0.05 V to 1.2 V (vs. RHE). In a case where the potential application signal pattern is a rectangular wave, in the oxide removal treatment, the number of potential cycles is preferably 1000 to 10000 when an operation of holding the potential at 0.05 V (vs. RHE) for 15 seconds to 60 seconds and an operation of holding the potential at 1.2 V (vs. RHE) for 15 seconds to 60 seconds are set as one cycle. On the other hand, in a case where the potential application signal pattern is a triangular wave, the number of potential cycles in the oxide removal treatment is preferably 1000 to 10000, and the potential scanning rate is, for example, 5 mV/sec to 100 mV/sec.

After the Cu-UPD treatment, the solution which has undergone the Cu-UPD treatment can be used as the copper-coated palladium-containing particle dispersion in the displacement step by dispersing the copper-coated palladium-containing particles in the solution. The acid used in the Cu-UPD treatment may remain in the copper-coated palladium-containing particle dispersion. It is preferable that inert gas is bubbled into the copper-coated palladium-containing particle dispersion in advance. The reason for this is that the oxidation of the copper-coated palladium-containing particles can be suppressed, and the uniform coating of the platinum-containing shell can be performed. As the inert gas, for example, nitrogen gas or argon gas can be used. A method of dispersing the copper-coated palladium-containing particle in the solvent is not particularly limited, and examples thereof include a method using an ultrasonic homogenizer. The mass concentration of the palladium-containing particles in the copper-coated palladium-containing particle dispersion is not particularly limited. In a case where the palladium-containing particles are supported on the support, the mass concentration of the support is preferably 0.5 g/L to 5 g/L. Further, the form of copper, with which the surfaces of the palladium-containing particles are coated, may be a copper monoatomic layer or a polyatomic layer in which two or more atoms are laminated. From the viewpoint of improving the mass activity, it is preferable that the shell is a copper monoatomic layer.

(2) Platinum Ion-Containing Solution Preparation Step

The platinum ion-containing solution is not particularly limited as long as it contains at least platinum ions. As a platinum salt used in the platinum ion-containing solution, for example, $K_2PtCl_4$ or $K_2PtCl_6$ can be used. In addition, an ammonia complex such as ($[PtCl_4][Pt(NH_3)_4]$) can be used. The platinum ion concentration in the platinum ion-containing solution is not particularly limited but is preferably 0.0005 mol/L to 0.04 mol/L. As the solvent which can be used in the platinum ion-containing solution, the same solvent as that used in the above-described copper ion-containing electrolytic solution can be used. In addition to the solvent and the platinum salt, the platinum ion-containing solution may contain, for example, an acid. As the acid, the same acid as that used in the above-described copper ion-containing electrolytic solution can be used. From the viewpoints of preventing the oxidation of the surfaces of the palladium-containing particles and the oxidation of copper, it is preferable that nitrogen is bubbled into the platinum ion-containing solution in advance by sufficiently stirring it.

(3) Displacement Step

In the displacement step, the shell is formed by mixing the copper-coated palladium-containing particle dispersion and the platinum ion-containing solution with each other in a microreactor to displace copper of the copper-coated palladium-containing particle surfaces with platinum. By mixing the copper-coated palladium-containing particle dispersion and the platinum ion-containing solution with each other, copper of the copper-coated palladium-containing particle surface can be displaced with platinum due to a difference in ionization tendency.

The microreactor according to the invention is a collective term for flow type reaction containers which perform a flow type reaction in a microspace by injecting two or more reaction raw material fluids from different inlet ports into the microspace at a high rate and causing the respective reaction raw material fluids to pass through the microspace while uniformly instantaneously mixing the reaction raw material fluids with each other due to a propulsive force of the high-rate injection. The microreactor which can be used in the invention is not particularly limited as long as it satisfies the following conditions: it includes at least a first supply flow path, a second supply flow path, a joint portion in which the first supply flow path and the second supply flow path are joined to each other, and a discharge flow path; and an orifice portion is provided midway in the discharge flow path. Specific examples of the microreactor include NANO-VATER ED015 (manufactured by Yoshida Kikai Co., Ltd.).

Figure 2:
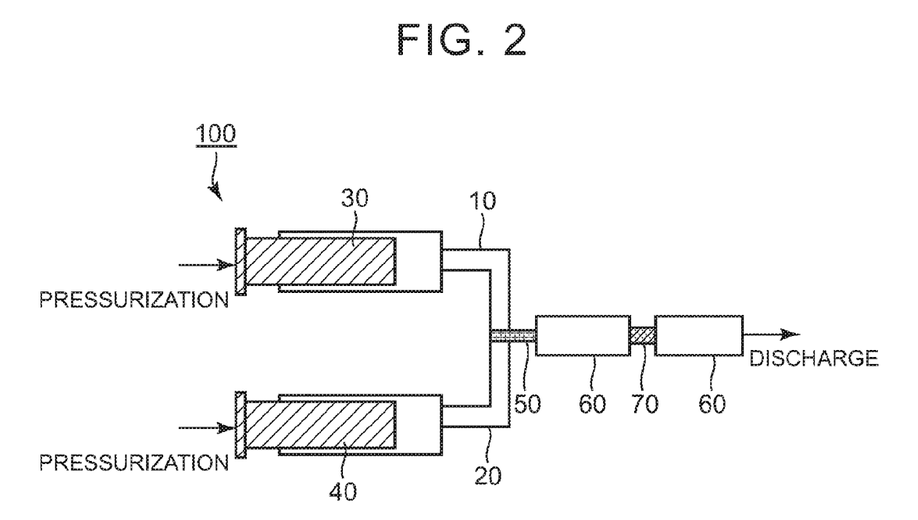
FIG. 2 is a schematic configuration diagram showing an example of a microreactor which can be used in the invention.

FIG. 2 is a schematic configuration diagram showing an example of the microreactor which can be used in the invention. As shown in FIG. 2, a microreactor 100 includes: a first supply flow path 10; a second supply flow path 20; pumps 30, 40 that are provided in the first supply flow path 10 and the second supply flow path 20, respectively; a joint portion 50 (microspace) in which the first supply flow path 10 and the second supply flow path 20 are joined to each other; a discharge flow path 60; and an orifice portion 70 that is provided midway in the discharge flow path 60.

Figure 3:
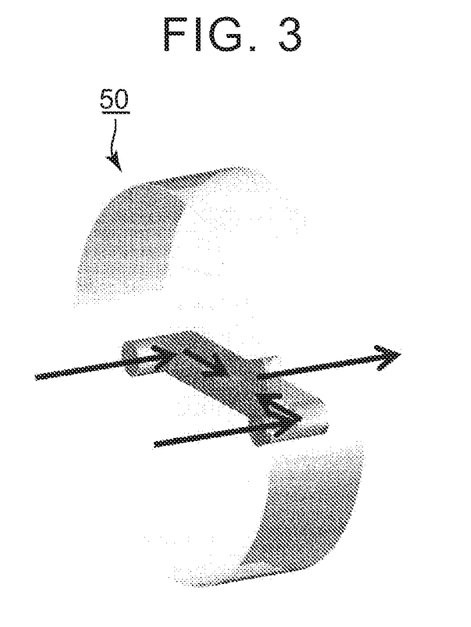
FIG. 3 is a perspective view showing an example of an internal structure of a joint portion which can be used in the invention.

FIG. 3 is a perspective view showing an example of an internal structure of the joint portion 50 (nozzle) which can be used in the invention. Arrows shown in FIG. 3 indicate flow directions of fluids. As shown in FIG. 3, in the joint portion 50, two fluids are joined to each other, and a continuous reaction advances in the junction.

In a case where the microreactor 100 shown in FIG. 2 is used, two or more reaction raw material fluids are caused to different supply flow paths, respectively, are injected into the joint portion 50 (microspace) at a high rate at a liquid feeding pressure, and pass through the joint portion 50 while uniformly instantaneously mixing the reaction raw material fluids with each other in the joint portion 50 due to a propulsive force of the high-rate injection. As a result, a flow type reaction advances in the joint portion 50. The fluid mixture in the joint portion 50 flows to the discharge flow path 60, passes through the orifice portion 70 that is provided midway in the discharge flow path 60, and is pressurized in the orifice portion 70, which accelerates the flow type reaction. Next, the fluid mixture is recovered to the outside. The fluid mixture may be aged while passing through the discharge flow path 60 and after being recovered in a recovery container.

The first supply flow path 10, the second supply flow path 20, and the discharge flow path 60 may be straight or curved. The number of supply flow paths is not particularly limited as long as at least two supply flow paths are provided such that two or more fluids are mixed with each other. The diameters (widths in a direction perpendicular to the flowing direction) or equivalent diameters (in a case where a section of a flow path is not circular) of the supply flow paths are not particularly limited. However, from the viewpoint of preventing flow path clogging, it is preferable that the diameters or equivalent diameters of the supply flow paths are more than the particle size of the palladium-containing particles or the support which can be used as a material. The lengths of the supply flow paths in the flowing direction are not particularly limited. The diameter or equivalent diameter of the discharge flow path only need to be more than the diameter or equivalent diameter of the orifice portion. That is, the sectional area of the discharge flow path only needs to be more than that of the orifice portion. The upper limit value of the diameter or equivalent diameter of the discharge flow path is not particularly limited but, from the viewpoint of accelerating the displacement reaction, is preferably 10 mm or less and more preferably 4 mm or less. That is, the sectional area of the discharge flow path is preferably 75 mm$^2$ or less and more preferably 12 mm$^2$ or less. An arrangement position of the orifice portion 70 in the discharge flow path 60 is not particularly limited as long as it is arranged downstream of the joint portion 50. The length of the discharge flow path 60 in the flowing direction in a region from the joint portion 50 to the orifice portion 70 is not particularly limited but, from the viewpoint of accelerating the displacement reaction, is preferably 3 cm to 5 cm. The materials of the supply flow paths and the discharge flow path are not particularly limited, and examples thereof include SUS312L.

Specific examples of the pumps 30, 40 which apply the liquid feeding pressure include a syringe pump and a plunger pump. Using the pumps 30, 40 the flow rates of the fluids which are mixed with each other in the joint portion 50 can be controlled to be in an optimum range all the time, and the pressure applied to the joint portion 50 and the orifice portion 70 can be controlled.

Examples of the joint portion 50 include a nozzle. The joint portion 50 is not particularly limited as long as it is a nozzle for a microreactor. The length of the nozzle, which is used as the joint portion 50, in the flowing direction is not particularly limited but is preferably 100 μm to 200 μm. The diameter (width in a direction perpendicular to the flowing direction) or equivalent diameter (in a case where a section of the nozzle is not circular) of the nozzle used as the joint portion 50 is not particularly limited. Regarding the inlet port of the nozzle, the upper limit value of the diameter is preferably 1 mm or less, more preferably 500 μm or less, and more preferably 190 μm or less. From the viewpoint of preventing flow path clogging, it is preferable that the lower limit value of the diameter is more than the particle size of the palladium-containing particles or the support which can be used as a material. Regarding an outlet port of the nozzle, the upper limit value of the diameter is not particularly limited but is preferably 460 μm or less. From the viewpoint of preventing flow path clogging, it is preferable that the lower limit value of the diameter is more than the particle size of the palladium-containing particles or the support which can be used as a material. The material of the nozzle used as the joint portion 50 is not particularly limited, and examples thereof include artificial diamond. In the displacement step, the lower limit value of the pressure applied to the joint portion 50 is preferably 5 MPa or higher and, from the viewpoint of improving the platinum mass activity, is more preferably 100 MPa or higher. The upper limit value is not particularly limited but is preferably 200 MPa or lower.

Figure 4:
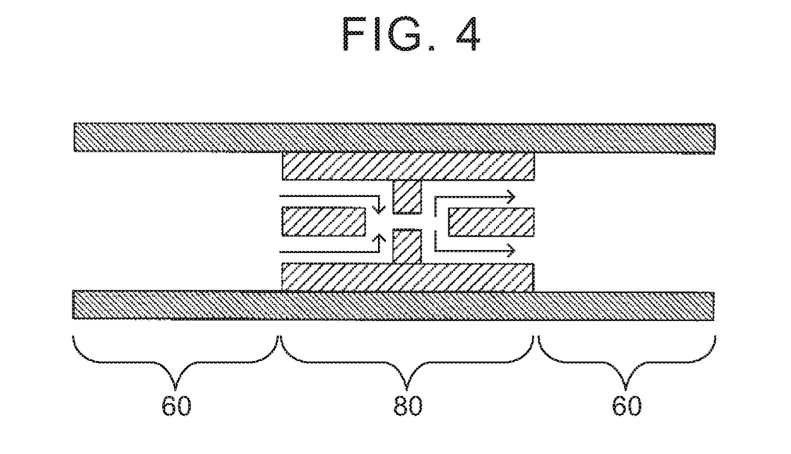
FIG. 4 is a schematic sectional view showing an example of an internal structure of a cross nozzle which can be used in the invention and is provided midway in a discharge flow path.

The orifice portion 70 is not particularly limited as long as the orifice portion 70 has a smaller flow path sectional area than the other portions of the discharge flow path 60. For example, a nozzle can be used, and specific examples thereof include a cross nozzle and a straight nozzle. From the viewpoint of accelerating the displacement reaction, a cross nozzle is preferable. FIG. 4 is a schematic sectional view showing an example of an internal structure of the cross nozzle which can be used in the invention and is provided midway in the discharge flow path. Arrows shown in FIG. 4 indicate flow directions of fluids. In a cross nozzle 80 shown in FIG. 4, two inlet ports and two outlet ports are provided. Two portions of the fluid mixture flowing from the two inlet ports into the cross nozzle 80 are joined to each other at the center of the cross nozzle 80, are mixed with each other again at the center, and are pressurized again, which accelerates the displacement reaction. The fluid mixture which has passed through the center of the cross nozzle 80 is discharged from the two outlet ports to the discharge flow path 60. The length of the nozzle, which is used as the orifice portion 70, in the flowing direction is not particularly limited but is preferably 100 μm to 200 μm. The diameter or equivalent diameter of the nozzle used as the orifice portion 70 is not particularly limited. For example, it is preferable that the upper limit value of diameter or equivalent diameter of the nozzle used as the orifice portion 70 is about 1 time to 1.2 times the upper limit of the inlet port of the nozzle of the joint portion 50. Specifically, the upper limit value of the diameter or equivalent diameter of the nozzle used as the orifice portion 70 is preferably 1.2 mm or less, more preferably 600 μm or less, and still more preferably 220 μm or less. From the viewpoint of preventing flow path clogging, it is preferable that the lower limit value of the diameter or equivalent diameter of the nozzle used as the orifice portion 70 is more than the particle size of the palladium-containing particles or the support which can be used as a material. The material of the nozzle used as the orifice portion 70 is not particularly limited, and examples thereof include artificial diamond. In the displacement step, the pressure applied to the orifice portion 70 is not particularly limited as long as it is 2 MPa or higher and, from the viewpoint of improving the platinum mass activity, is preferably 70 MPa or higher. The upper limit value of the pressure applied to the orifice portion is not particularly limited but is preferably 150 MPa or lower. A method of measuring the pressure applied to the joint portion 50 and the orifice portion 70 is not particularly limited, and examples thereof include a method of measuring the pressure using a pressure sensor.

The shell according to the invention contains platinum or a platinum alloy. Examples of the platinum alloy include an alloy of platinum and a metal material selected from the group consisting of iridium, ruthenium, rhodium, nickel, and gold. The metal material other than platinum constituting the platinum alloy may be one kind or two or more kinds. It is preferable that the platinum content in the platinum alloy is 90 mass % or higher when the total mass of the alloy is expressed by 100 mass %. The reason for this is as follows: when the platinum content is lower than 90 mass %, sufficient catalytic activity and durability cannot be obtained.

An example of the displacement step will be described using the microreactor 100 shown in FIG. 2. In the microreactor 100, the copper-coated palladium-containing particle dispersion and the platinum ion-containing solution are supplied into the joint portion 50 through different injection holes, respectively. At this time the copper-coated palladium-containing particle dispersion is supplied from the first supply flow path 10 by applying a predetermined pressure thereto using the pump 30, and the platinum ion-containing solution is supplied from the second supply flow path 20 by applying a predetermined pressure thereto using the pump 40. As a result, the copper-coated palladium-containing particle dispersion and the platinum ion-containing solution can be mixed with each other. The fluid mixture obtained in the joint portion 50 flows to the discharge flow path 60, is pressurized again in the orifice portion 70 which is provided midway in the discharge flow path 60, and then is discharged to the outside of the microreactor 100. The fluid mixture discharged from the discharge flow path 60 is recovered in the recovery container. The pressure values applied to the copper-coated palladium-containing particle dispersion and the platinum ion-containing solution, which are supplied from the respective supply flow paths, may be the same as or different from each other. By controlling the pressure values different from each other, the volumes of the copper-coated palladium-containing particle dispersion and the platinum ion-containing solution, which are supplied from the joint portion 50, can be controlled to be different from each other. In a case where the microreactor 100 is used, the displacement reaction time refers to a period of time during which the fluid mixture obtained in the joint portion 50 flows through the discharge flow path 60, passes through the orifice portion 70, and is discharged to the outside of the microreactor 100.

When the copper-coated palladium-containing particle dispersion and the platinum ion-containing solution are supplied into the microreactor in the displacement step, the liquid temperatures of the copper-coated palladium-containing particle dispersion and the platinum ion-containing solution are not particularly limited and may be room temperature (25° C.). From the viewpoints of preventing the oxidation of the surfaces of the palladium-containing particles and the oxidation of copper, it is preferable that, when the copper-coated palladium-containing particle dispersion and the platinum ion-containing solution are supplied into the microreactor, the copper-coated palladium-containing particle dispersion and the platinum ion-containing solution are made not to be exposed. The flow rates of the copper-coated palladium-containing particle dispersion and the platinum ion-containing solution when mixed with each other are not particularly limited. The flow rate of the copper-coated palladium-containing particle dispersion when passing through the joint portion 50 is preferably 3 mL/sec to 20 mL/sec. The volume ratio of the copper-coated palladium-containing particle dispersion to the platinum ion-containing solution when mixed with each other is not particularly limited and can be appropriately set by controlling the mass concentration of the copper-coated palladium-containing particle in the copper-coated palladium-containing particle dispersion, the platinum ion concentration in the platinum ion-containing solution, and the like. For example, the volume ratio of the copper-coated palladium-containing particle dispersion to the platinum ion-containing solution is preferably 1:1 to 8:1.

Figure 5:
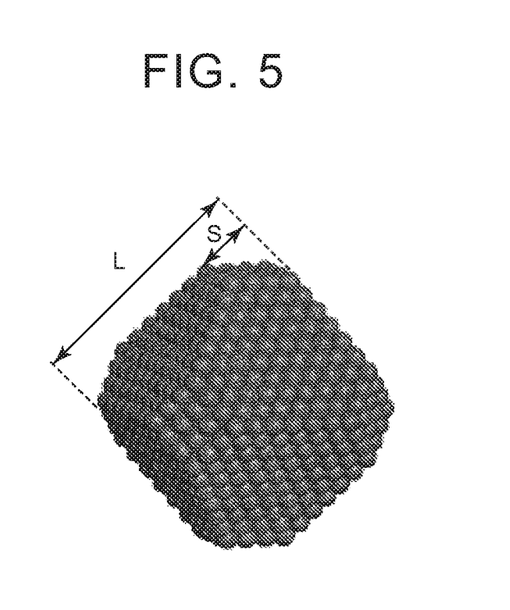
FIG. 5 is a diagram showing a truncated octahedral shape.

The platinum ion concentration in the mixed solution of the copper-coated palladium-containing particle dispersion and the platinum ion-containing solution is not particularly limited and is preferably 1 time to 1.5 times a theoretical value at which a geometrical palladium particle surface can be coated with a platinum monoatomic film. The theoretical value at which a geometrical palladium particle surface can be coated with a platinum monoatomic film was calculated using the following method. First, a model structure was conceived in which spheres having an atomic diameter of palladium were arranged to form a face-centered cubic lattice and in which an aggregate of the spheres forms a truncated octahedron shown in FIG. 5. The truncated octahedral shape shown in FIG. 5 is a structure in which a ratio s/L of one side s of a truncated portion to one side L of the octahedron is 0.2. Using this truncated octahedral shape, the number of all the atoms contained in the palladium particles having different particle sizes and the number of surface atoms were calculated, respectively. Based on a ratio of the number of surface atoms to the number of all the atoms, a theoretical value which is necessary for a geometrical palladium particle surface to be coated with a platinum monoatomic film was calculated. The particle size of a palladium particle was calculated as the distance between opposite two sides of a projection shape when a particle of the truncated octahedron was seen from the right above. In a case where the particle size of a palladium particle is 4 nm (in theoretical calculation, 4.2 nm to be exact), the theoretical value which is necessary for a geometrical palladium particle surface to be coated with a platinum monoatomic film is 0.364 mol of platinum with respect to 1 mol of palladium.

The mixed solution of the copper-coated palladium-containing particle dispersion and the platinum ion-containing solution, which is discharged from the inside of the microreactor, may be recovered in an air atmosphere or may be in an inert gas atmosphere such as nitrogen gas or argon gas. From the viewpoint of displacing unreacted copper with platinum, it is preferable that the mixed solution is recovered in an inert gas atmosphere. Optionally, it is preferable that the mixed solution is stirred in an inert gas atmosphere. The stirring time in the inert gas atmosphere is not particularly limited but is preferably 1 minute to 90 minutes.

(4) Cleaning Step

In the cleaning step, the obtained core-shell catalyst is cleaned after the displacement step. A cleaning method is not particularly limited, and examples thereof include a method including: filtering the mixed solution of the copper-coated palladium-containing particle dispersion and the platinum ion-containing solution after the displacement step; and dispersing a core-shell catalyst, which is obtained by filtering the mixed solution, in water to be cleaned. A method of dispersing the core-shell catalyst in water is not particularly limited, and examples thereof include a dispersing method using an ultrasonic homogenizer, a magnetic stirrer, or a stirring blade-equipped motor.

(6) Drying Step

In the drying step, the obtained core-shell catalyst is dried. A method of drying the core-shell catalyst is not particularly limited as long as a solvent or the like can be removed, and examples thereof include a method of leaving the core-shell catalyst to stand in an inert gas atmosphere at a temperature of 50° C. to 100° C. for 6 hours to 12 hours. Optionally, the core-shell catalyst may be pulverized. A pulverizing method is not particularly limited as long as a solid material can be pulverized. Examples of the pulverization include: pulverization using a mortar or the like in an inert gas atmosphere or in air; and mechanical milling using a ball mill, a turbo mill, a jet mill, or the like.

Example 1

First, a palladium-supported carbon (Pd/C; Pd support ratio: 30 mass %) was prepared in which commercially available palladium particles having an average particle size of 4 nm were supported on carbon particles. 20 g of the Pd/C was put into a reaction container, 10 L of ultrapure water was further added, the Pd/C was dispersed using an ultrasonic homogenizer for 2 hours, and then sulfuric acid was added. As a result, a Pd/C dispersion was prepared. The sulfuric acid concentration in the Pd/C dispersion was adjusted to be 0.05 mol/L, and the total amount of the Pd/C dispersion was adjusted to be 40 L. That is, the Pd/C mass concentration in the Pd/C dispersion was adjusted to 0.5 g/L.

[Oxide Removal Treatment]

Next, in the reaction container, a working electrode (glassy carbon), a counter electrode (platinum mesh), and a reference electrode (silver-silver chloride) were arranged so as to be dipped in the Pd/C dispersion. The reaction container was sealed, nitrogen gas was bubbled into the Pd/C dispersion, and oxygen was removed. The working electrode, the counter electrode, and the reference electrode were connected to a potentiostat, a potential having a triangular wave pattern was applied to the working electrode at a potential scanning rate of 20 mV/sec in a potential range of 0.4 V to 0.65 V (vs. RHE), and this cycle was repeated 3000 cycles. As a result, a palladium oxide and impurities present on palladium particle surfaces were removed. The potential of the silver-silver chloride electrode is described as a value vs. RHE.

[Cu-UPD Treatment]

While bubbling nitrogen into the Pd/C dispersion in the reaction container, copper sulfate pentahydrate was added to the reaction solution such that the copper ion concentration in the Pd/C dispersion was adjusted to be 0.05 mol/L. By fixing the potential of the working electrode to 0.37 V (vs. RHE) using the potentiostat, copper was deposited on the palladium particle surfaces. Occasionally, the solution in the reaction container was stirred using a stirring bar. The potential application was performed until the reaction current was normal and approached zero.

[Copper-Coated Palladium-Containing Particle Dispersion Preparation Step]

Next, the obtained copper-coated palladium particles were dispersed in the reaction container using an ultrasonic homogenizer to prepare 40 L of a copper-coated palladium particle dispersion. The Pd/C mass concentration in the copper-coated palladium particle dispersion was adjusted to be 0.5 g/L.

[Platinum Ion-Containing Solution Preparation Step]

As a platinum ion-containing solution, 20 L of a 0.001 mol/L $K_2PtCl_4$ solution was prepared.

[Displacement Step]

As a microreactor, NANOVATER ED015 (manufactured by Yoshida Kikai Co., Ltd.) was prepared. A nozzle for a microreactor (diameter of inlet port: 190 μm, diameter of outlet port: 460 μm) was arranged in a joint portion in the microreactor. As a orifice portion, a cross nozzle (diameter: 220 μm) was arranged midway in a discharge flow path (diameter: 4 mm) in the microreactor. The length of the discharge flow path in a region from the joint portion to the orifice portion was 3 cm. As materials of the supply flow paths and the discharge flow path, SUS312 was used. The copper-coated palladium particle dispersion and the platinum ion-containing solution were supplied into the microreactor from the first supply flow path and the second supply flow path, respectively, while preventing contact with oxygen. In the microreactor, a pressure applied to the joint portion was set as 5 MPa, a pressure applied to the orifice portion was set as 2 MPa, and copper on the palladium particle surfaces were displaced with platinum. The supply rates of the copper-coated palladium particle dispersion and the platinum ion-containing solution into the microreactor were adjusted such that the volume ratio during mixing in the joint portion was 2:1, that is, such that the ratio of the Pd/C mass concentration to the platinum ion concentration was 1 (g/L):0.001 (mol/L). The temperatures during the supply of the copper-coated palladium particle dispersion and the platinum ion-containing solution into the microreactor were adjusted to be 25° C., respectively. The time required for all of 40 L of the copper-coated palladium particle dispersion to pass through the inside of the microreactor was about 230 minutes. After the mixing, the mixed solution of the copper-coated palladium particle dispersion and the platinum ion-containing solution was recovered in a recovery container which was arranged at a downstream end of the discharge flow path and is in an air open state.

[Cleaning Step]

After the displacement step, the mixed solution in the recovery container was filtered under reduced pressure to obtain slurry-like powder, and the slurry-like power was dispersed in and cleaned with 4 L of pure water at 80° C. The filtering and the cleaning were repeated 5 times until the filtrate was neutral. The time required for 5 times of cleaning was about 200 minutes. Next, a dispersion obtained by dispersing the slurry-like powder was dispersed in pure water was filtered, and the obtained residue was put into and washed with 40 L of 1 mol/L nitric acid solution to remove impurities. Next, the nitric acid dispersion was filtered, and the obtained filtrate was cleaned with pure water. The filtering and the cleaning were repeated 5 times until the filtrate was neutral. The time required for 5 times of cleaning was about 200 minutes. Accordingly, the total time required from the reaction in the microreactor to the cleaning was about 630 minutes.

[Drying Step]

After the cleaning, the catalyst cake was dried in a drying furnace under reduced pressure at 60° C. for 10 hours. As a result, a powder sample was dried such that the water content was about 5% or less. This powder sample was pulverized using a mill to obtain a core-shell catalyst.

Example 2

A core-shell catalyst was produced using the same method as in Example 1, except that, in the displacement step, the copper-coated palladium particle dispersion and the platinum ion-containing solution were supplied into the microreactor from the first supply flow path and the second supply flow path, respectively, while preventing contact with oxygen such that a pressure applied to the joint portion in the microreactor was 25 MPa and such that a pressure applied to the orifice portion in the microreactor was 17 MPa. The time required for all of 40 L of the copper-coated palladium particle dispersion to pass through the inside of the microreactor was about 110 minutes.

Example 3

A core-shell catalyst was produced using the same method as in Example 1, except that, in the displacement step, the copper-coated palladium particle dispersion and the platinum ion-containing solution were supplied into the microreactor from the first supply flow path and the second supply flow path, respectively, while preventing contact with oxygen such that a pressure applied to the joint portion in the microreactor was 50 MPa and such that a pressure applied to the orifice portion in the microreactor was 36 MPa. The time required for all of 40 L of the copper-coated palladium particle dispersion to pass through the inside of the microreactor was about 70 minutes.

Example 4

A core-shell catalyst was produced using the same method as in Example 1, except that, in the displacement step, the copper-coated palladium particle dispersion and the platinum ion-containing solution were supplied into the microreactor from the first supply flow path and the second supply flow path, respectively, while preventing contact with oxygen such that a pressure applied to the joint portion in the microreactor was 100 MPa and such that a pressure applied to the orifice portion in the microreactor was 70 MPa. The time required for all of 40 L of the copper-coated palladium particle dispersion to pass through the inside of the microreactor was about 50 minutes.

Example 5

A core-shell catalyst was produced using the same method as in Example 1, except that, in the displacement step, the copper-coated palladium particle dispersion and the platinum ion-containing solution were supplied into the microreactor from the first supply flow path and the second supply flow path, respectively, while preventing contact with oxygen such that a pressure applied to the joint portion in the microreactor was 150 MPa and such that a pressure applied to the orifice portion in the microreactor was 110 MPa. The time required for all of 40 L of the copper-coated palladium particle dispersion to pass through the inside of the microreactor was about 40 minutes.

Example 6

A core-shell catalyst was produced using the same method as in Example 1, except that, in the displacement step, the copper-coated palladium particle dispersion and the platinum ion-containing solution were supplied into the microreactor from the first supply flow path and the second supply flow path, respectively, while preventing contact with oxygen such that a pressure applied to the joint portion in the microreactor was 200 MPa and such that a pressure applied to the orifice portion in the microreactor was 150 MPa. The time required for all of 40 L of the copper-coated palladium particle dispersion to pass through the inside of the microreactor was about 30 minutes.

Comparative Example 1

A core-shell catalyst was produced using the same method as in Example 1, except that the orifice portion was not arranged midway in the discharge flow path of the microreactor. The time required for all of 40 L of the copper-coated palladium particle dispersion to pass through the inside of the microreactor was about 220 minutes.

Comparative Example 2

A core-shell catalyst was produced using the same method as in Example 2, except that the orifice portion was not arranged midway in the discharge flow path of the microreactor. The time required for all of 40 L of the copper-coated palladium particle dispersion to pass through the inside of the microreactor was about 100 minutes.

Comparative Example 3

A core-shell catalyst was produced using the same method as in Example 3, except that the orifice portion was not arranged midway in the discharge flow path of the microreactor. The time required for all of 40 L of the copper-coated palladium particle dispersion to pass through the inside of the microreactor was about 70 minutes.

Comparative Example 4

A core-shell catalyst was produced using the same method as in Example 4, except that the orifice portion was not arranged midway in the discharge flow path of the microreactor. The time required for all of 40 L of the copper-coated palladium particle dispersion to pass through the inside of the microreactor was about 50 minutes.

Comparative Example 5

A core-shell catalyst was produced using the same method as in Example 6, except that the orifice portion was not arranged midway in the discharge flow path of the microreactor. The time required for all of 40 L of the copper-coated palladium particle dispersion to pass through the inside of the microreactor was about 30 minutes.

Comparative Example 6

A core-shell catalyst was produced using the same method as in Example 1, except that, in the displacement step, the copper-coated palladium particle dispersion and the platinum ion-containing solution were supplied into the microreactor from the first supply flow path and the second supply flow path, respectively, while preventing contact with oxygen such that a pressure applied to the joint portion in the microreactor was 1 MPa and such that a pressure applied to the orifice portion in the microreactor was 0.5 MPa. The time required for all of 40 L of the copper-coated palladium particle dispersion to pass through the inside of the microreactor was about 480 minutes.

Comparative Example 7

A core-shell catalyst was produced using the same method as in Example 1, except that the following configurations. In the platinum ion-containing solution preparation step, 1 mol/L of citric acid was added a 0.001 mol/L $K_2PtCl_4$ solution to prepare 20 L of a platinum ion-containing solution. In the displacement step, the orifice portion was not arranged midway in the discharge flow path of the microreactor. The supply rates of the copper-coated palladium particle dispersion and the platinum ion-containing solution into the microreactor were adjusted such that the ratio of the Pd/C mass concentration, the platinum ion concentration, and the citric acid ion concentration was 1 (g/L):0.001 (mol/L):1 (mol/L). A pressure applied to the joint portion was set as 25 MPa, and copper on the palladium particle surfaces were displaced with platinum. The time required for all of 40 L of the copper-coated palladium particle dispersion to pass through the joint portion was about 100 minutes. After the mixing, the mixed solution of the copper-coated palladium particle dispersion and the platinum ion-containing solution was recovered in a recovery container, which was arranged at a downstream end of the discharge flow path, and was stirred in a nitrogen atmosphere for 90 minutes. In the cleaning step, after the displacement step, the mixed solution in the recovery container was filtered under reduced pressure to obtain slurry-like powder, and the slurry-like power was dispersed in and cleaned with 4 L of pure water at 80° C. The filtering and the cleaning were repeated 10 times until the filtrate was neutral. The time required for 10 times of cleaning was about 400 minutes.

Next, a dispersion obtained by dispersing the slurry-like powder was dispersed in pure water was filtered, and the obtained residue was put into and washed with 40 L of 1 mol/L nitric acid solution to remove impurities. Next, the nitric acid dispersion was filtered, and the obtained filtrate was cleaned with pure water. The filtering and the cleaning were repeated 5 times until the filtrate was neutral. The time required for 5 times of cleaning was about 200 minutes. Accordingly, the total time required from the reaction in the microreactor to the cleaning was about 790 minutes.

Comparative Example 8

A core-shell catalyst was produced using the same method as in Example 1, except that the following displacement reaction (the displacement reaction using the dripping method) was performed instead of the displacement step. 40 L of a copper-coated palladium particle dispersion having a Pd/C mass concentration of 0.5 g/L, which was maintained at 5° C., was supplied to a reaction container. Next, while stirring the copper-coated palladium particle dispersion, a platinum ion-containing solution in which 20 mL of 0.001 mol/L $K_2PtCl_4$ solution was added to citric acid so that a concentration of citric acid was 1 mol/L was dripped onto the copper-coated palladium particle dispersion using a tube pump at 40 mL/min (required time: 500 minutes). Next, a mixed solution of the copper-coated palladium particle dispersion and the platinum ion-containing solution was stirred in a nitrogen atmosphere for 1600 minutes (24 hours) to displace copper on palladium particle surfaces with platinum. That is, the time required for the displacement reaction was 2100 minutes, which is the sum of the dripping time (500 minutes) and the stirring time (1600 minutes).

[Evaluation of Mass Activity]

30 mg of the core-shell catalyst obtained in each of Examples 1 to 6 and Comparative Examples 1 to 8 was collected, and the core-shell catalyst was dispersed in a mixed solution containing 131 μL of 5% NAFION (registered trade name) dispersion, 30 mL of ultrapure water, and 7.5 mL of isopropanol to prepare a catalyst ink. The catalyst ink was applied to a glassy carbon electrode of a rotating disk electrode (RDE) and was naturally dried. Regarding the core-shell catalyst, an oxygen reduction reaction (ORR) measurement was performed. ORR measurement conditions were as follows.

Electrolytic solution: 0.1 mol/L of a perchloric acid aqueous solution (which was saturated with oxygen in advance by bubbling oxygen gas thereinto)
Atmosphere: oxygen atmosphere
Scanning rate: 10 mV/sec
Potential scanning rate: 1.05 V to 0.05 V (vs. RHE)
Rotating speed: 1600 rpm Based on an oxygen reduction wave which was obtained from the ORR measurement, the catalytic activity of platinum per unit mass (MA) in the core-shell catalyst was calculated. The catalytic activity of platinum per unit mass (A/g-Pt) in the core-shell catalyst was calculated using the following method. First, a kinetically-controlled current (Ik) was obtained from the following expression (1), in which an oxygen reduction current ($I_{0.9}$) represents a current value of 0.9 V (vs. RHE), and a diffusion-limited current ($I_{lim}$) represents a current value of 0.3 V (vs. RHE) in scanning from 0.05 V (vs. RHE) to 1.05 V (vs. RHE) during a second cycle of potential scanning when a potential scanning of 1.05 V (vs. RHE)→0.05 V(vs RHE)→1.05 V (vs. RHE) in the oxygen reduction wave obtained from the ORR measurement was set as one cycle. Next, the catalytic activity of the core-shell catalyst per unit mass (A/g-Pt) was calculated dividing the amount of platinum (g) contained in the core-shell catalyst, which was applied to the glassy carbon electrode, by the kinetically-controlled current (Ik). The amount of platinum contained in the core-shell catalyst was calculated from the coating amount of the catalyst ink by measuring the amount of platinum (mass %) of the core-shell catalyst using an inductively coupled plasma mass spectrometer (ICP-MS)

$$Ik=(I_{lim} \times I_{0.9})/(I_{lim}-I_{0.9}) \quad (1)$$

In the expression (1), the meanings of the respective symbols are as follows.
Ik: kinetically-controlled current (A)
$I_{lim}$: diffusion-limited current (A)
$I_{0.9}$: oxygen reduction current (A)
The results of measuring the catalytic activity of platinum per unit mass are shown in Table 1.

Example 7, citric acid was added to the platinum ion-containing solution, the orifice portion was not provided midway in the discharge flow path of the microreactor, and the mixed solution was stirred in a nitrogen atmosphere for 90 minutes after being recovered from the microreactor. When Example 1 is compared to Comparative Example 7, as shown in Table 1, it can be seen that the platinum mass activity of Example 1 was 5 A/g-Pt higher than that in Comparative Example 7. Accordingly, it can be seen that, in Example 1 in which the reaction inhibitor was not used in the displacement reaction using the microreactor which was provided with the orifice portion, an effect of improving the platinum mass activity of the core-shell catalyst was higher than that in a case where the reaction inhibitor was used in the displacement reaction using the microreactor which was not provided with the orifice portion. In addition, in Comparative Example 7, the reaction inhibitor was used in the

TABLE 1

| | Synthesis Method | Copper-Coated Pd/C Dispersion Pd/C Concentration (g/L) | Platinum Ion-Containing Solution Platinum Ion Concentration (mol/L) | Citric Acid Concentration (mol/L) | Volume Ratio (Copper-Coated Pd/C Dispersion: Platinum Ion-Containing Solution) | Synthesis Temperature °C | Pressure Applied to Joint Portion MPa | Pressure Applied to Orifice Portion MPa | Orifice Portion Present/Absent | Nitrogen Purge Time min | catalytic activity A/g-Pt |
|---|---|---|---|---|---|---|---|---|---|---|---|
| Example 1 | Micro-reactor | 0.5 | 0.001 | 0 | 2:1 | 25 | 5 | 2 | Present | 0 | 740 |
| Example 2 | | | | | | | 25 | 17 | | | 760 |
| Example 3 | | | | | | | 50 | 36 | | | 750 |
| Example 4 | | | | | | | 100 | 70 | | | 850 |
| Example 5 | | | | | | | 150 | 110 | | | 870 |
| Example 6 | | | | | | | 200 | 150 | | | 860 |
| Comparative Example 1 | Micro-reactor | 0.5 | 0.001 | 0 | 2:1 | 25 | 5 | — | Absent | 0 | 650 |
| Comparative Example 2 | | | | | | | 25 | — | | | 670 |
| Comparative Example 3 | | | | | | | 50 | — | | | 690 |
| Comparative Example 4 | | | | | | | 100 | — | | | 680 |
| Comparative Example 5 | | | | | | | 200 | — | | | 695 |
| Comparative Example 6 | | | | | | | 1 | 0.5 | Present | | 680 |
| Comparative Example 7 | | | | 1.0 | | | 25 | — | Absent | 90 | 735 |
| Comparative Example 8 | Dripping | | 0.001 | 1.0 | 2:1 | 5 | — | — | — | 2100 | 670 |

[Platinum Mass Activity]
As shown in Table 1, the platinum mass activities of the core-shell catalysts are as follows.
Example 1: 740 A/g-Pt
Example 2: 760 A/g-Pt
Example 3: 750 A/g-Pt
Example 4: 850 A/g-Pt
Example 5: 870 A/g-Pt
Example 6: 860 A/g-Pt
Comparative Example 1: 650 A/g-Pt
Comparative Example 2: 670 A/g-Pt
Comparative Example 3: 690 A/g-Pt
Comparative Example 4: 680 A/g-Pt
Comparative Example 5: 695 A/g-Pt
Comparative Example 6: 680 A/g-Pt
Comparative Example 7: 735 A/g-Pt
Comparative Example 8: 670 A/g-Pt
[Presence of Reaction Inhibitor]
In Example 1, citric acid was not added to the platinum ion-containing solution. On the other hand, in Comparative displacement reaction using the microreactor which was not provided with the orifice portion, and then the recovered mixed solution was stirred in a nitrogen atmosphere. On the other hand, in Example 1, the reaction inhibitor was not used in the displacement reaction using the microreactor which was provided with the orifice portion, and then the recovered mixed solution was not stirred in a nitrogen atmosphere. It can be seen that, although the total time required from the reaction in the microreactor to the cleaning was short in Example 1, the effect of improving the platinum mass activity of the core-shell catalyst of Example 1 is equal to or higher than that of Comparative Example 7. Further, when Example 1 is compared to Comparative Example 8 in which the displacement reaction was performed using the dripping method by adding citric acid to the platinum ion-containing solution, as shown in Table 1, it can be seen that the platinum mass activity of Example 1 was 70 A/g-Pt higher than that of Comparative Example 8. Accordingly, in Example 1, the time required for the displacement reaction was shorter, and the effect of improving the platinum mass activity of the core-shell catalyst was higher as compared to Comparative Example 8 in which the displacement reaction was performed using the reaction inhibitor according to the dripping method of the related art. It can be seen from the above results that, according to the invention, a core-shell catalyst having high platinum mass activity can be produced without using a reaction inhibitor.

[Relationship between Platinum Mass Activity and Pressure]

When Example 1 in which the pressure applied to the orifice portion was set as 2 MPa is compared to Comparative Example 6 in which the pressure applied to the orifice portion was set as 0.5 MPa, it can be seen that the platinum mass activity of Example 1 was 60 A/g-Pt higher than that in Comparative Example 6. When Examples 1 to 6 in which the pressures applied to the joint portion and the orifice portion were different from each other are compared to each other, it can be seen that the platinum mass activity values of Examples 4 to 6 in which the pressures applied to the orifice portion were 70 MPa to 150 MPa were higher by 90 A/g-Pt to 130 A/g-Pt than those of Examples 1 to 3 in which the pressures applied to the orifice portion were 2 MPa to 36 MPa. On the other hand, when Comparative Examples 1 to 5 in which the pressures applied to the joint portion were different from each other are compared to each other, it can be seen that a difference between the platinum mass activity of Comparative Example 5 having the highest platinum mass activity, in which the pressure applied to the joint portion was set as 200 MPa, and the platinum mass activity of Comparative Example 1 having the lowest platinum mass activity, in which the pressure applied to the joint portion was set as 5 MPa, was only 45 A/g-Pt. Accordingly, it can be seen that, by providing the orifice portion midway in the discharge flow path of the microreactor, the effect of improving the platinum mass activity of the core-shell catalyst, which is obtained by increasing the pressure applied to the joint portion, can be enhanced.

What is claimed is:

1. A method of producing a core-shell catalyst, the core-shell catalyst including
a core containing palladium, and
a shell containing platinum with which the core is coated,
the method comprising:
a step of preparing a copper-coated palladium-containing particle dispersion in which copper-coated palladium-containing particles, which are obtained by coating surfaces of palladium-containing particles with copper, are dispersed;
a step of preparing a platinum ion-containing solution; and
a displacement step of forming the shell by mixing the copper-coated palladium-containing particle dispersion and the platinum ion-containing solution with each other in a microreactor to displace copper of the copper-coated palladium-containing particle surfaces with platinum, wherein
the microreactor includes a first supply flow path, a second supply flow path, a joint portion in which the first supply flow path and the second supply flow path are joined to each other, and a discharge flow path,
an orifice portion is provided midway in the discharge flow path, and
a pressure applied to the orifice portion in the displacement step is 2 MPa or higher.

2. The method according to claim 1, wherein the orifice portion is a cross nozzle.

3. The method according to claim 1, wherein the palladium-containing particles are supported on a support.

* * * * *